J. T. UNDERWOOD.
METHOD OF AND APPARATUS FOR TREATING CERAMIC AND SIMILAR MATERIAL.
APPLICATION FILED NOV. 3, 1917.
1,298,125.
Patented Mar. 25, 1919.
2 SHEETS—SHEET 2.
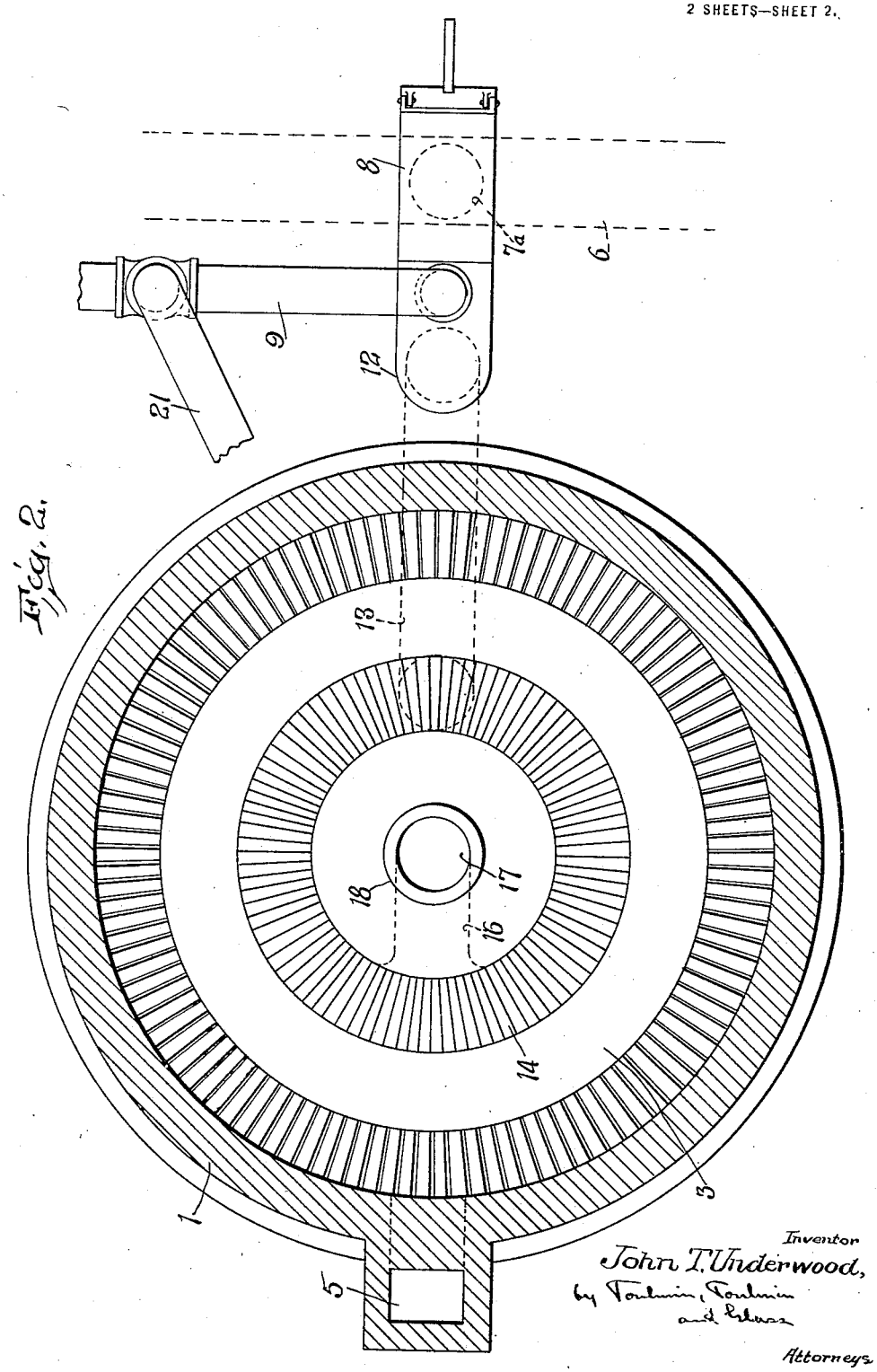
Inventor
John T. Underwood,
Attorneys

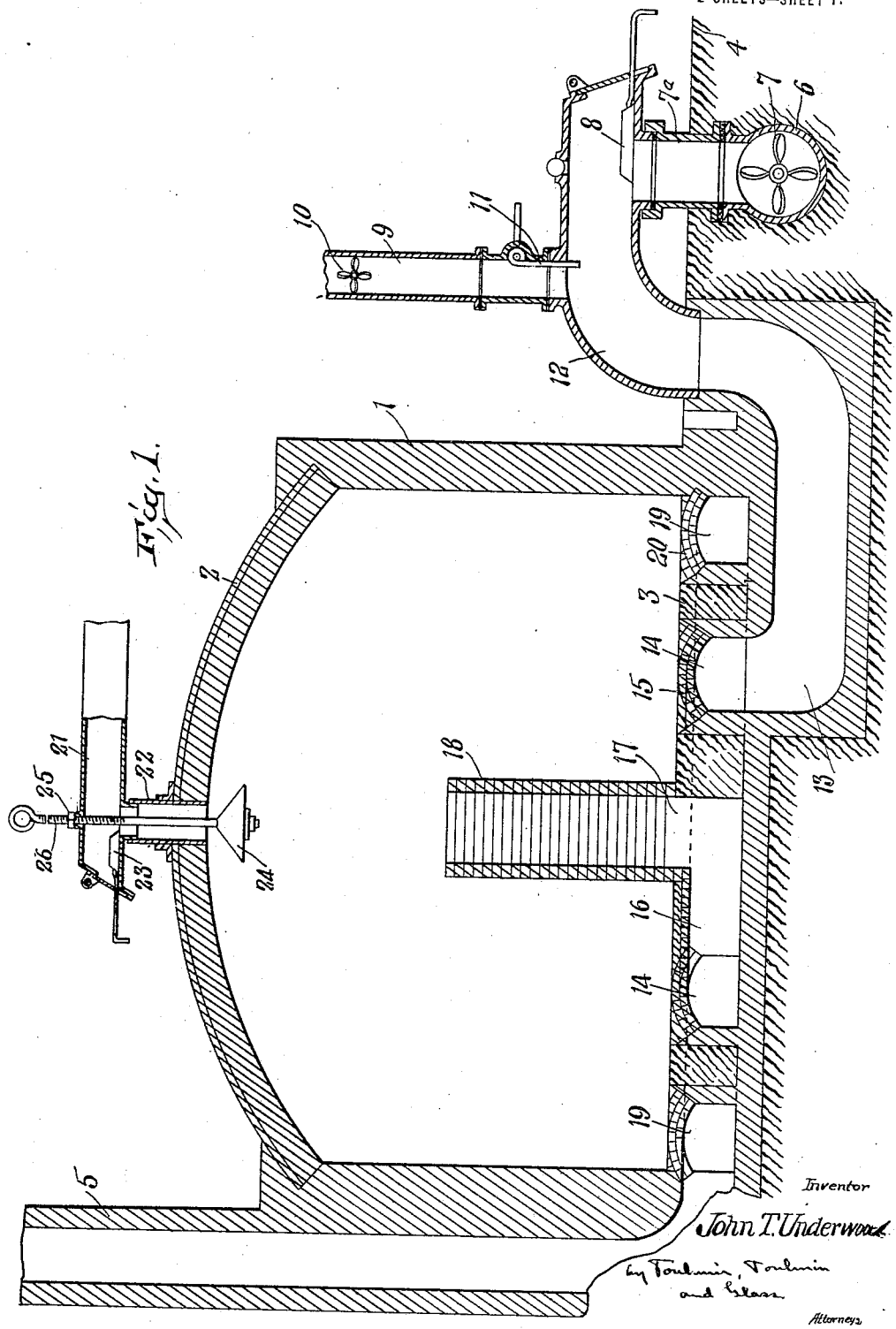

UNITED STATES PATENT OFFICE.

JOHN T. UNDERWOOD, OF DAYTON, OHIO, ASSIGNOR TO UNDERWOOD ENGINEERING COMPANY, OF DETROIT, MICHIGAN, A CORPORATION OF MICHIGAN.

METHOD OF AND APPARATUS FOR TREATING CERAMIC AND SIMILAR MATERIAL.

1,298,125.     Specification of Letters Patent.    Patented Mar. 25, 1919.

Application filed November 3, 1917. Serial No. 200,078.

*To all whom it may concern:*

Be it known that I, JOHN T. UNDERWOOD, a citizen of the United States, residing at Dayton, in the county of Montgomery and State of Ohio, have invented certain new and useful Improvements in Methods of and Apparatus for Treating Ceramic and Similar Material, of which the following is a specification, reference being had therein to the accompanying drawing.

This invention relates to a method of and an apparatus for treating ceramic and similar materials and is shown as particularly adapted to a brick kiln.

The invention provides a construction which is an improvement on a prior patent to the applicant No. 1,105,724, Aug. 8, 1914, and a patent to Underwood and Justice, No. 1,224,978, May 8, 1917, the improvement residing in a novel method and apparatus for causing an even treatment of ceramic material, such as brick, whereby the material is burned evenly and more economically.

The invention comprises means for radiating heat from a large surface, and also causing the direct application of heat to the material being treated. To this end a preheating of the material near the bottom of the kiln and the ground or floor of the kiln adjacent thereto is given by radiated heat. As is well known, the down draft type of kiln tends to form the material near the top of the kiln too hard if a sufficient amount of heat to burn the material at the bottom properly is applied, because of the tendency of heated air to rise to the top of the kiln. By the present invention the preheating of the material near the bottom of the kiln overcomes this difficulty and more evenly burned material results, without causing over burning of material near the top of the kiln. Thus a large proportion of satisfactorily burned material is produced and economy of operation is attained.

In the construction shown the directly applied hot air enters the kiln at the center and leaves through a passage substantially at the kiln wall. Thus the full value of the heat is obtained and there are no soft brick near the side walls of the kiln, as all the brick in the kiln are subjected to directly applied heat.

As a further improvement, the burning of the material may take place in two stages, the first stage comprising the mixing of gaseous fuel and air in a furnace or combustion chamber located outside of the kiln, the combustion chamber leading under and then into the kiln, and the combustion of the fuel taking place partly outside and partly under the kiln. The second stage comprises forcing gaseous fuel into the kiln at one point, and then mixing it in the kiln space, and near the top thereof with air which is forced into the kiln at a second point. Thus, in the second stage combustion takes place entirely inside the kiln, and by this means different treatments may be given the material in the kiln and different effects produced.

The construction employs only one furnace, thus making a much cheaper installation of the system, and also increasing the capacity of the kiln for ceramic material, due to the ability to put such material in the space formerly occupied by the furnaces inside the kiln.

Referring to the drawings, Figure 1 is a central vertical section of a kiln showing the invention adapted thereto, this being merely one of the types of kiln to which it is adapted and being shown simply as illustrative; and Fig. 2 is a horizontal section of Fig. 1 taken just above the level of the kiln floor but with the gas and air supply devices shown in plan.

In the two prior patents referred to a method of operation for treating ceramic material is disclosed comprising the forcing of mixed gaseous fuel and air into a kiln under a pressure greater than that of the outside atmosphere. The kiln walls are substantially air tight and thus the fuel may be forced into the kiln and the entrance of cold air from the outside of the kiln be prevented because of the higher pressure existing in the kiln. The present invention employs this type of kiln in general but improves the prior constructions by providing a more economical method of utilizing the heat of the combustion of the fuel and air and causing the treatment of the material to take place in two stages.

Referring to the drawings, a kiln is shown having circular walls 1 and a roof 2, both the side walls 1 and the roof 2 being substantially air tight. The floor 3 of the kiln is substantially at the level of the ground 4 and this floor may be composed partly of earth, as indicated and partly of the roofs of two fuel passages shown in these drawings as being circular and concentric. The products of combustion pass out of the kiln through a stack 5 which may be of the usual type employed in down draft kilns.

During the first stage of the operation the gas and air is mixed outside of the kiln proper. There is shown a gas supply 6 through which gas is forced under greater than atmospheric pressure. Any desired method of producing this pressure may be employed and there is shown merely a conventional fan 7 which may be employed or any other desired method of producing pressure may be used. From the supply pipe 6 the gas passes through a pipe 7$^a$, exit from which is controlled by a valve 8 given a merely conventional showing. The air is supplied through a pipe 9 being forced therethrough by any desired device, a fan 10 being shown as a conventional means and the supply of air through the pipe 9 is controlled by a valve 11. The gas and air pass through a pipe 12 and are mixed by their passage through this pipe. From the pipe 12 a passage 13 shown as being below the level of the ground leads under the kiln proper. This passage may be lined with brick or any other desired material. Leaving the passage 13 the mixed fuel and air enters the inner one of the circular fuel passages. This inner passage 14 is covered with a continuous or solid roof 15 of heat resisting material, such as fire brick. As shown on Fig. 2 the passage 14 leads in both directions from the entrance of passage 13 so that the fuel may pass in both directions around the center of the kiln until it reaches the other side of that center. At this point a passage 16 leads to the center of the kiln and the floor is there provided with an opening 17 through which the mixed fuel and air enter above the kiln floor. A stack 18 is shown as above the entrance 17 and this may be a permanent stack of heat resisting material or it may be a temporary stack made at each operation of the kiln of material to be treated. In the case of brick, for example, the stack 18 may be constructed of the brick to be treated, these brick being piled one on top of the other as shown to form a solid stack and the remainder of the kiln filled with other brick.

When the gas and air supply are turned on by opening the valves 8 and 11 and combustion of the mixture is caused the combustion takes place partly in the passage 13 and partly in the circular passage 14. The pressure of the gas and air causes the mixture to move rapidly through these passages and to enter the kiln through the stack 18. The roof 15 of the circular passage 14 becomes very hot and thus radiates a large amount of heat into the kiln proper. Also the products of combustion passing into the kiln from the stack 18 act directly on the material therein and thus an economical operation is produced as both radiated and direct heat are employed. In fact the roof 15 of the circular passage 14 may become substantially red hot, but it is constructed of fire resisting material so that no damage is thereby done.

The outer circular passage 19 is provided with a perforated roof 20 which may be composed of brick, as shown in Fig. 2, the brick being spaced apart to form the perforations. Thus the products of combustion in the kiln are forced through these perforations in the roof 20 at all points in the circumference of the kiln and these combustion products pass through the passage 19 and thence out of the kiln through the stack 5. It will be understood that the heat of the products of combustion is not sufficient at the time they reach the perforated roof 20 to require this roof to be made of a highly heat resisting material.

It will be seen that the combustion products enter the kiln proper at the center thereof and pass out of the kiln near its circumference. Thus the material in the kiln is thoroughly and evenly treated and all of the heat in the combustion products is utilized. The gas and air are forced into the kiln under pressure and although the draft may be helped by the stack 5 after that becomes heated, nevertheless the operation of the system does not at all depend on this stack 5, but is caused by the pressure of the entering fuel and air being greater than that of the atmosphere.

The method as thus far disclosed is complete and would be entirely operative. However, as a matter of further improvement there is shown means for causing a second stage of the operation, this stage consisting in the forcing of air into the kiln at a point above the stack 18, whereby mixture of fuel and air and combustion may occur entirely inside the kiln. Fig. 1 shows an air entrance pipe 21 which may, as indicated in Fig. 2, be connected with the first air pipe 9 so that the air may be supplied from a common source and pipe 21 is connected to a vertical pipe 22 passing through the kiln roof, the entrance to pipe 22 being controlled by any desired air valve 23.

A deflector 24 which is of heat resisting material is positioned directly below the point the air pipe 22 enters the kiln and may be adjusted in any desired manner, a nut 25 moving on a thread in a rod 26 which supports the deflector 24 being shown.

As the air enters the kiln through the pipe 22 it strikes the deflector 24 and thus is caused to move in all directions from the center of the kiln.

After the first stage of the operation has been completed the air valve 11 is partly or entirely shut off so as to stop the entrance of air from the pipe 9 to the pipe 12. Then the gas passes from the supply pipe 6 through the passages 12 and 13 around the circular passage 14 and out into the kiln through the stack 18 without being mixed with air and without combustion being caused. Then the air valve 23 is open and air permitted to pass into the kiln around the deflector 24. This mixes with the gas coming from stack 18 and combustion then takes place entirely inside the kiln and in the upper part thereof. Of course, the air supply from pipe 9 need not be entirely shut off and if a part of the air needed for combustion with the gas is furnished through supply pipe 9 then part of the combustion will take place as the mixture enters the kiln and the remaining part of the combustion take place inside the kiln when air from pipe 22 mixes with unconsumed fuel.

The two stage operation thus provided serves to cause a more even burning of the material being operated on than was the case with the systems of the prior patents referred to. During the first stage the bottom of the kiln is very highly heated because of the radiation through the roof 15, while during the second stage of the operation the upper part of the kiln becomes highly heated because of the combustion taking place at that point and the lower part of the kiln remains in its highly heated condition so that more uniform treatment of the material is thereby obtained.

From the description given it will be seen that the objects first pointed out are well attained by the method and the apparatus disclosed. The kiln produces evenly burned material and with great economy of fuel. There is a cool space outside the point of exit of the combustion products, and thus all the material is fully burned. The preheating of the bottom of the kiln economizes heat and overcomes the difficulty found, of burning material at the bottom of the kiln properly without overburning that near the kiln top. The two stage operation provides a control of the quality of the product and permits the different effects to be readily obtained.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:—

1. In a device of the class described, the combination, with a kiln comprising side walls and a roof, and a floor having two concentric circular fuel passages thereunder, one covered continuously and one having a perforated covering, of means for forcing fuel through the continuously covered passage, thence through the kiln space, next through the perforated covering into the other fuel passage and finally out of the kiln.

2. In a device of the class described, the combination, with a kiln comprising substantially air tight walls and roof, and a floor having two fuel passages thereunder, one having a continuous covering and the other having a perforated covering, both coverings forming part of the floor of the kiln, of means for forcing gaseous fuel, first, through the continuously covered passage, thence, into the kiln space above the kiln floor, next, through the perforations into said other passage, and finally, out of the kiln.

3. In a device of the class described, the combination, with a kiln having substantially air tight walls and roof, and a floor having two fuel passages thereunder, one continuously covered by an arched roof, and the other covered by a perforated roof, both roofs forming part of the floor of the kiln, of means for forcing gaseous fuel under pressure through said continuously covered passage, thence through the kiln space above the kiln floor, next through the perforated covering into said other passage, and finally out of the kiln.

4. In a device of the class described, the combination, with a kiln having substantially air tight walls and roof, and a floor having two concentric fuel passages thereunder, the passage nearer the kiln center being continuously covered by an arched roof of heat resisting material, the other passage having a perforated roof, both roofs forming part of the kiln floor, of means for forcing gaseous fuel under pressure greater than atmospheric, first, through said passage nearer the kiln center, thence, through the kiln space above the kiln floor, next, through the perforated roof into the other passage and, finally, out of the kiln.

5. In a device of the class described, the combination, with a kiln having substantially air tight walls and roof, a floor having two fuel passages thereunder, one having a continuous covering and the other having a perforated covering, both coverings forming part of the kiln floor, and a temporary stack placed centrally on the kiln floor and above a fuel passage leading through the floor into said continuously covered passage, of means for forcing gaseous fuel through said continuously covered passage, next, through the passage in the kiln floor and through said temporary stack, thence, through the kiln space above the floor, next through said perforated covering into the other fuel passage and finally out of the kiln.

6. In a device of the class described, the combination, with a kiln having substantially air tight walls and roof, and a stack in the kiln, of means for forcing gaseous fuel and air into the kiln through said stack, and an air passage leading through the kiln roof at a point above said stack, with means for forcing air under pressure through said air passage into the kiln.

7. In a device of the class described, the combination, with a kiln having substantially air tight walls and roof, and a stack in the kiln, of means for forcing gaseous fuel and air into the kiln through said stack, devices for separately regulating the amount of gas and air passing through said stack, an air passage leading through the kiln roof at a point above the outlet of said stack, means for forcing air through said air passage into the kiln, with devices for regulating the amount of air so supplied.

8. The method of treating ceramic material, which comprises forcing mixed gaseous fuel and air into a kiln under pressure at one point causing partial combustion of the mixture to take place as the mixture enters the kiln at said point, then forcing air under pressure into the kiln at another point, mixing the air with the gaseous fuel entering the kiln at the first point, and completing combustion of the fuel entirely inside the kiln space.

9. The method of treating ceramic material, which comprises placing the material in a kiln, forcing mixed gaseous fuel and air under pressure into the kiln at one point, causing combustion of said mixture as it enters the kiln at said point, then forcing air under pressure into the kiln at another point and preventing further entrance of air at said first point, mixing the fuel entering the kiln at the first point with the air entering at the second point, and causing combustion of the mixed fuel and air entirely inside the kiln.

10. The method of treating ceramic material, which comprises placing the material to be treated in a kiln, forcing mixed gaseous fuel and air through a solidly covered passage under the kiln floor and then into the kiln space at the center thereof, causing combustion of the mixed fuel and air as it moves through said covered passage, and forcing the products of combustion out of the kiln near the side walls thereof by the pressure of the entering mixture at the kiln center.

In testimony whereof I affix my signature.

JOHN T. UNDERWOOD.

Copies of this patent may be obtained for five cents each, by addressing the "Commissioner of Patents, Washington, D. C."